United States Patent
Glider et al.

(10) Patent No.: US 9,215,067 B2
(45) Date of Patent: Dec. 15, 2015

(54) ACHIEVING STORAGE EFFICIENCY IN PRESENCE OF END-TO-END ENCRYPTION USING DOWNSTREAM DECRYPTERS

(71) Applicant: International Business Machines Corporation, Armonk, NY (US)

(72) Inventors: Joseph S. Glider, Palo Alto, CA (US); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/857,505

(22) Filed: Apr. 5, 2013

(65) Prior Publication Data

US 2014/0301545 A1 Oct. 9, 2014

(51) Int. Cl.
  *H04L 9/00* (2006.01)
  *H04L 9/08* (2006.01)
  *H04L 9/28* (2006.01)
  *H04K 1/00* (2006.01)
  *H04L 29/06* (2006.01)
  *G06F 11/30* (2006.01)
  *G06F 12/14* (2006.01)

(52) U.S. Cl.
  CPC .................................. *H04L 9/0894* (2013.01)

(58) Field of Classification Search
  None
  See application file for complete search history.

(56) References Cited

U.S. PATENT DOCUMENTS

| | | | |
|---|---|---|---|
| 5,594,869 A * | 1/1997 | Hawe et al. | 713/152 |
| 5,604,801 A * | 2/1997 | Dolan et al. | 713/159 |
| 6,061,449 A | 5/2000 | Candelore et al. | |
| 7,792,300 B1 * | 9/2010 | Caronni | 380/277 |
| 8,199,911 B1 | 6/2012 | Taur et al. | |
| 2001/0018741 A1 | 8/2001 | Hogan | |
| 2009/0316899 A1 * | 12/2009 | Kim et al. | 380/255 |
| 2010/0017593 A1 * | 1/2010 | Putz | 713/150 |
| 2010/0083003 A1 | 4/2010 | Spackman | |
| 2010/0313040 A1 | 12/2010 | Lumb | |
| 2012/0137139 A1 * | 5/2012 | Kudoh et al. | 713/189 |
| 2012/0204024 A1 | 8/2012 | Augenstein et al. | |
| 2013/0031636 A1 * | 1/2013 | Altschul et al. | 726/26 |
| 2013/0121486 A1 * | 5/2013 | Spies et al. | 380/30 |
| 2013/0145177 A1 * | 6/2013 | Cordella et al. | 713/193 |
| 2013/0177157 A1 * | 7/2013 | Li et al. | 380/277 |
| 2013/0311780 A1 * | 11/2013 | Besehanic | 713/176 |
| 2014/0143885 A1 * | 5/2014 | Blotsky et al. | 726/27 |
| 2014/0161196 A1 * | 6/2014 | Culebro et al. | 375/240.26 |
| 2014/0164760 A1 * | 6/2014 | Hybertson | 713/153 |
| 2014/0237255 A1 * | 8/2014 | Martin et al. | 713/182 |

FOREIGN PATENT DOCUMENTS

JP 2011233157 11/2011

* cited by examiner

*Primary Examiner* — Shin-Hon Chen
(74) *Attorney, Agent, or Firm* — Lieberman & Brandsdorfer, LLC

(57) ABSTRACT

Embodiments of the invention relate to efficiently storing encrypted data in persistent storage or passing to another data processing component. A downstream decrypter is utilized to act within the data path between a data generator and a storage server. The decrypter fetches an encryption key and any other necessary auxiliary information necessary to decrypt received data. Following decryption of the data, the decrypter has the ability to operate directly on plaintext and perform storage efficiency functions on the decrypted data. The decrypter re-encrypts the data prior to the data leaving the decrypter for persistent storage to maintain the security of the encrypted data.

18 Claims, 6 Drawing Sheets

ACHIEVING STORAGE EFFICIENCY IN PRESENCE OF END-TO-END ENCRYPTION USING DOWNSTREAM DECRYPTERS

BACKGROUND

The present invention relates to data storage. More specifically, the invention relates to utilizing a decrypter, downstream in the data path from the place where data was encrypted, for securely and efficiently storing encrypted data blocks.

End-to-end encryption is the process of encrypting data close to the source before committing it to storage. This encryption process has become increasingly prevalent due to security concerns regarding third party storage or cloud providers, domain-specific regulations mandating the encryption of sensitive data, ensuring secure deletion of data, and its requirement in high-security data centers.

Encrypting data is limiting however, in that the majority of storage efficiency functions do not achieve their intended functions when operating on encrypted data. Encrypted data maximizes the entropy of ciphertext, and as a consequence, cannot be compressed. Furthermore, encryption of data blocks in two different files or two different locations result in different ciphertexts, resulting in the failure of standard deduplication attempts.

BRIEF SUMMARY

This invention comprises a method, system, and computer program product for performing data functions effectively on encrypted data that normally only operate effectively on clear text.

A method, computer program product, and system are provided for efficiently storing encrypted data. A decrypter receives at least one data block of ciphertext for storage. The data block is received in an encrypted form and is associated with a key that can be used to decrypt the data. An encryption algorithm is instantiated for the received data block of ciphertext. The block(s) of ciphertext are decrypted to a non-encrypted form using the associated encryption key. One or more functions are performed on the non-encrypted data block(s), and the decrypted data block is re-encrypted with the encryption key prior to the re-encrypted data leaving the decrypter.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
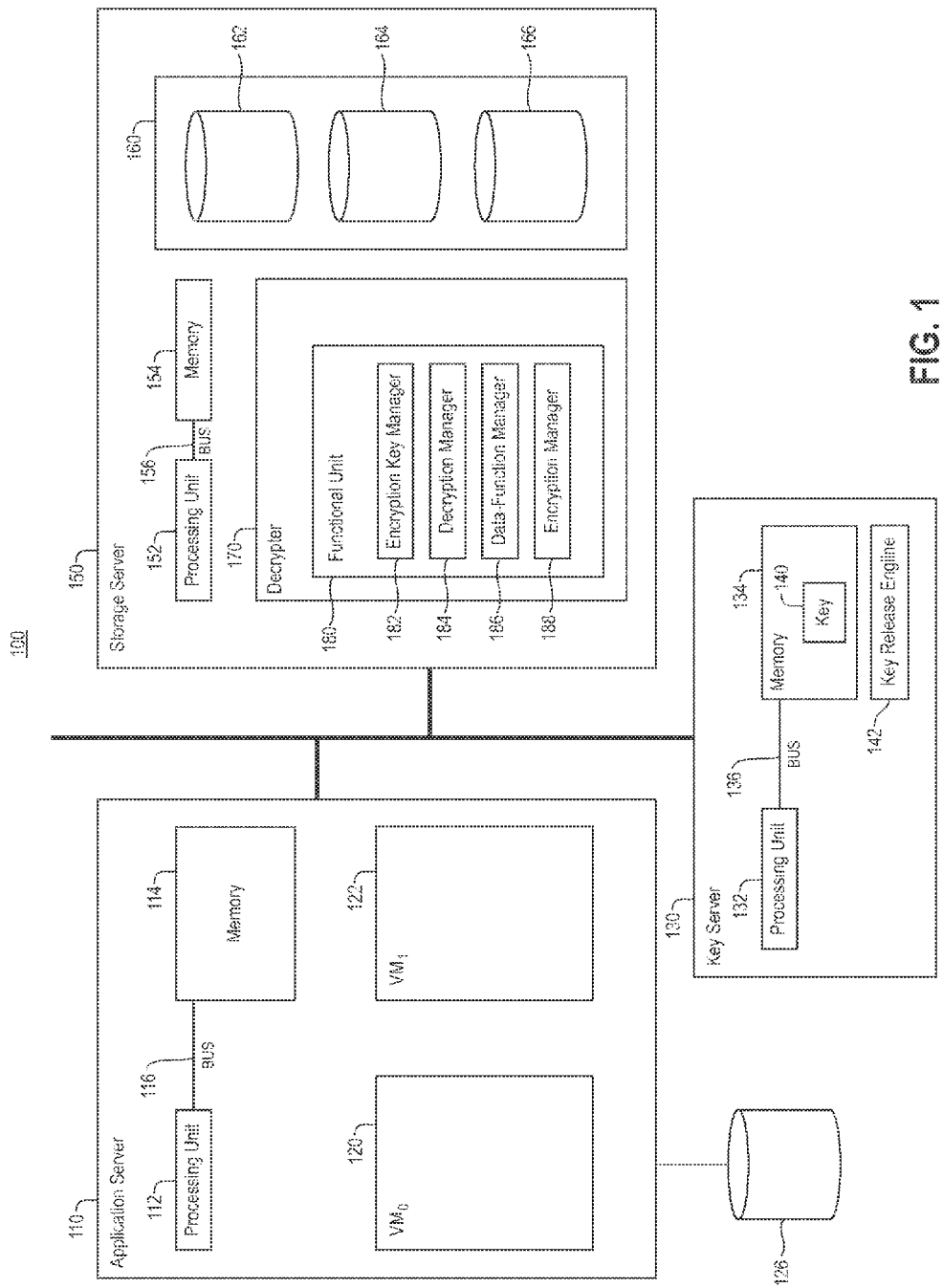
FIG. 1 depicts a block diagram illustrating tools embedded in a computer system to support a technique employed for efficient storage of encrypted data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A decrypter, as described hereafter, is a component part of a data path between an application generating and/or using data and a persistent medium where generated and/or used data is stored. In one embodiment, the decrypter is a compute node. The decrypter, when granted permission, has access to encryption keys and metadata containing sufficient information pertaining to the ciphertext to allow for decryption. Furthermore, the decrypter has the ability to obtain any decryption key(s) required to decrypt the original plaintext, e.g. non-encrypted, version of the data block(s). Once the original plaintext is available, the decrypter may operate on the plaintext directly, and can perform required storage efficiency functions or other functions which require the data to be in an unencrypted form. In one embodiment, the decrypter does not require any modification to an encryption algorithm. In another embodiment, the decrypter neither imposes constraints on its placement in the data path, e.g. it does not need to be placed upstream with respect to the location of the encryption function, nor does it require relocation of the component performing encryption. Accordingly, in one embodiment, the decrypter is a secure component or module in which data is prepared for storage in a persistent device, e.g. back end storage, or passed to another data processing component A plurality of security measures may be implemented to ensure that the environment of the decrypter is trustworthy. In one embodiment, the decrypter may be operated as a secure/trusted application e.g. packaged as a secure application in a trusted computing environment. In another embodiment, the decrypter has the ability to leverage a hardware method e.g. a trusted platform module, to establish a root of trust. In one embodiment, the decrypter is granted the ability to manage and/or control encryption keys and other information used to decrypt data, or can be refused access to and/or control of encryption keys in the event that the key owner does not authorize the decrypter to access the data encrypted with that key. In one embodiment, the decrypter can be implemented to only cache encryption keys in secure volatile memory, TPM or other Hardware Security Module (HSM). In this embodiment, the decrypter may expose an interface through which the client may require secure erasure of keys in the cache, TPM or HSM. Accordingly, the decrypter is characterized as a package application, or compute node that has the functionality to revoke decryption abilities that had been previously granted.

FIG. 1 is a block diagram (100) illustrating tools embedded in a computer system to support a technique employed for efficiently storing encrypted data. There are three primary components shown herein, including an application server (110), a key server (130), and a storage server (150). In one embodiment, a shared pool of configurable computer resources may be employed in place of the storage server (150), wherein the shared pool is located in at least one data center.

The application server (110) is provided with a processing unit (112) in communication with memory (114) across a bus (116). The application server (110) is shown with two virtual machines (120) and (122). Although only two virtual machines are shown, the invention should not be limited to these quantities, as these quantities are merely for illustrative purposes. The quantity of the virtual machines in communication with the application server (110) may be increased or decreased. Data storage (126) is provided in local communication to the application server (110), to store data generated by the application server (110). Accordingly, the application server (110) generates data to be stored, either locally on local data storage (126), or remotely by the storage server (150) or an alternate storage device.

As shown, a key server (130) is provided in communication with the application server (110). The key server (130) is provided with a processing unit (132) in communication with memory (134) across a bus (136). One or more encryption keys (140), hereinafter referred to as a key, are stored local to the key server (130) and are employed to encrypt and decrypt data. For illustrative purposes, only one key (140) is shown, although in one embodiment, a plurality of keys may be stored local to the key server (130). As shown, the key (140) is stored local to memory (134). In addition, in the illustrated embodiment, a key-release engine (142) is provided local to the key server (130) In one embodiment, the key-release engine (142) grants the key (140), and the granted key is used to decrypt encrypted data. Accordingly, the key-release engine (142) manages release of one or more keys (140) for decryption of data.

The storage server (150) is in communication with the key server (130). As shown, the storage server (150) has a processing unit (152), in communication with memory (154) across a bus (156). In the illustrated embodiment, the storage server (150) is in communication with data storage (160), which is shown herein with a plurality of data storage modules (162), (164), and (166). While three modules are shown respectively, any number of data storage modules may be implemented. The storage server (150) is further provided with a decrypter (170) in communication with memory (154). The decrypter (170) includes a functional unit (180) having one or more tools to support data decryption, performing data functions, and re-encrypting encrypted data. The tools embedded in the functional unit (180) include, but are not limited to, an encryption key manager (182), a decryption manager (184), a data-function manager (186), and an encryption manager (188).

Upon receipt of at least one encrypted data block or file of ciphertext from the application server (110), the decryption manager (184) instantiates a decryption algorithm for the received data block or file, hereinafter referred to as data. The encryption key manager (182) fetches the encryption key from the key server (130). From metadata or other information accompanying the received data block(s), the decryption manager (184) further determines the appropriate tweak, seed, salt, or Initialization Vector, needed to decrypt the received data block(s). Accordingly, the decryption manager (184) gathers and determines the tools necessary to decrypt the received data.

The decryption manager (184) is in communication with the encryption key manager (182). The decryption manager (184), using the key provided by the encryption key manager (182), functions to decrypt the received data of ciphertext to one or more non-encrypted data block(s) or file(s). The data function manager (186) functions to perform one or more data functions on the decrypted data. The data functions may include, but are not limited to, reduction of the data, compression of the data, de-duplication of the data, applying an anti-virus scan to the data, and/or applying an indexing scan to the data. These data functions are not viable to be performed on encrypted data, and therefore, in one embodiment, application is limited to the decrypted data in the secure location of the decrypter (170). The re-encryption manager (188) is provided in communication with the data function manager (186). Once all data functions are performed, the re-encryption manager (188) using the encryption key (140), functions to re-encrypt the decrypted data block(s). In one embodiment, the received data block(s) does not leave the decrypter (170) prior to re-encryption. Accordingly, data is decrypted, manipulated, and re-encrypted all within the trusted data decrypter.

As identified above, the encryption key manager (182), decryption manager (184), data function manager (186), and re-encryption manager (188), are shown residing in the functional unit (180) of the trusted decryption manager (170) local to the storage server (150). Although in one embodiment, the functional unit (180) and managers (182)-(188) may reside as hardware tools external to the memory (154) of the storage server (150). In another embodiment, the managers (182)-(188) may be implemented as a combination of hardware and software in the shared pool of resources. Similarly, in one embodiment, the managers (182)-(188) may be combined into a single functional item that incorporates the functionality of the separate items. As shown herein, each of the manager(s) (182)-(188) are shown local to one storage server (150). However, in one embodiment they may be collectively or individually distributed across a shared pool of configurable computer resources and function as a unit to support decryption, data manipulation, and re-encryption. Accordingly, the managers may be implemented as software tools, hardware tools, or a combination of software and hardware tools.

Furthermore, the described features, structures, or characteristics may be combined in any suitable manner in one or more embodiments. Examples of managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit(s) described above in FIG. 1 has been labeled with managers. A manager may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 2:
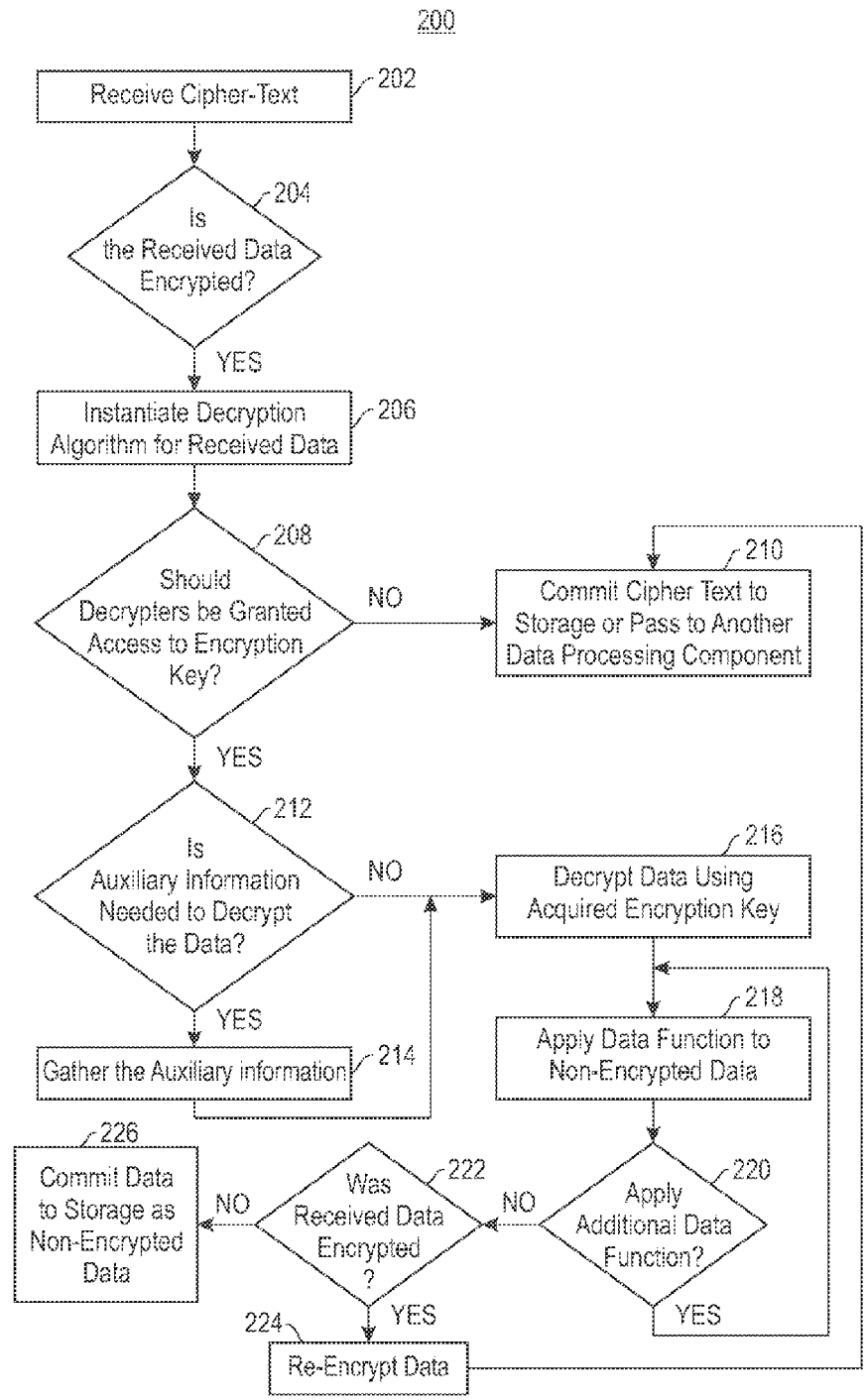
FIG. 2 is a flow chart illustrating a method for efficient storage of encrypted data.

FIG. 2 is a flow chart (200) illustrating a method for efficiently storing encrypted data using a decrypter. An encrypted data block or file, referred to herein as ciphertext, is received by a decrypter prior to storage of the ciphertext in a persistent storage device or passed to another data processing component (202). In one embodiment, the function of the decrypter is to process the received ciphertext in preparation for re-encryption and commitment of the re-encrypted data to a persistent storage device. However, in another embodiment, the function of the decrypter may be to pass the re-encrypted data to another data processing component, for example for transmission of a disaster recovery copy of the data across a wide area network (WAN). Although the description teaches one data block, in one embodiment the decrypter may receive a plurality of data blocks or files. The decrypter may receive or need to gather auxiliary information with an encrypted data block. The provided auxiliary information is required for decryption of ciphertext encoded with certain types of encryption algorithms. Following receipt of the data block at step (202), it is determined if the received data block is encrypted (204). In one embodiment, the decryption process is limited to those blocks that are encrypted. A positive response is followed by instantiating a decryption algorithm for the received data block (206). The instantiation at step (206) provides the technique needed to decrypt the data. In one embodiment, the instantiation indicates the type of encryption algorithm that was used to encrypt the data, and whether auxiliary information is needed to decrypt the data.

Following step (206), it is determined if the decrypter should be granted access to the encryption key (208). A negative response to the determination at step (208) is followed by committing the ciphertext to persistent storage (210), or in one embodiment, passing the re-encrypted data to another data processing component, for example for transmission of a disaster recovery copy of the data across a WAN. However, a positive response to the determination at step (208) is followed by determining if auxiliary information is needed to decrypt the data (212). In one embodiment, the auxiliary information is block oriented, such as a logical block address and volume number where the data is stored. Similarly, in one embodiment, the auxiliary information is file oriented, such as the inode number and offset within the file where the data is stored. A positive response to the determination at step (212) is followed by gathering the auxiliary information (214). However, a negative response to the determination at step (212), or after the process of gather the auxiliary information is completed at step (214), is followed by decrypting the data block using the acquired encryption key (216) and the auxiliary information where applicable. Accordingly, encrypted ciphertext is decrypted using the decrypter, and received ciphertext that cannot be decrypted is committed to persistent storage or passed to another data processing component.

Once ciphertext is decrypted by the decrypter, the non-encrypted data block or file is prepared for persistent storage or passed to another data processing component. Following a negative response to the determination at step (204), e.g. the received data block is not encrypted, or following step (216), a data function is applied to the non-encrypted data block (218). The application of the data function may include, but is not limited to, compression, de-duplication, an anti-virus scan, an indexing scan, or any other application to the data that can only be performed on data in a non-encrypted form. Following step (218), it is determined if an additional function is to be performed on the non-encrypted data (220). A positive response to the determination of step (220) is followed by a return to step (218). However, a negative response to the determination at step (220) indicates that performance of the additional function on the non-encrypted data is complete. The negative response to the determination at step (220) is followed by determining if the data received at step (202) was encrypted (222). Data that was not originally encrypted is not re-encrypted. As shown a positive response to the determination at step (222) results in re-encryption of the decrypted ciphertext with the encryption key (224), e.g. the same acquired encryption key, and a return to step (210) for commitment of the data to storage of another data processing component. Similarly, a negative response to the determination at step (222) is followed by committing the processed data to storage or another data processing component in non-encrypted form (226). In one embodiment, any method, technique and/or tool, used to decrypt the data, is reapplied to re-encrypt the data. Once the data is re-encrypted, the data is committed to persistent storage or passed to another data processing component (210). Accordingly, received ciphertext is selectively processed.

Figure 3:
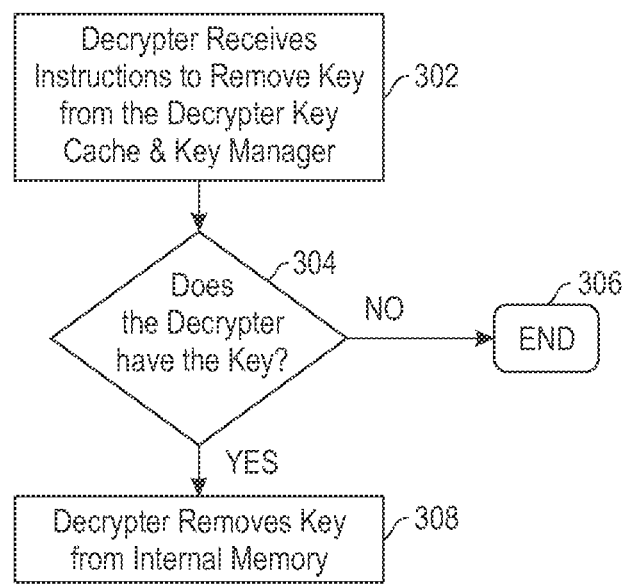
FIG. 3 is a flow chart illustrating a method for encryption key deletion.

As described herein, encrypted data is encrypted with an encryption key. In order to maintain the privacy of encrypted data that is erased, encryption keys must be removed from the decrypter. FIG. 3 is a flow chart (300) illustrating a method for removing encryption keys from the key manager or key cache in the decrypter. The encryption key is stored with a key server, or in one embodiment with a component that stores the key, until instructions are received to remove the key from the key manager or cache. The decrypter receives instructions from an entity trying to erase the key, or a proxy, to remove the key from the key manager or cache (302). Following receipt of instructions, it is determined if the decrypter has the key (304). In one embodiment, the key may be temporarily stored. For example, in one embodiment, the key may have been cached for a limited time. If at step (304) it is determined that the decrypter does not have the key, the process of removing the key is concluded (306). However, if at step (304) it is determined that the decrypter has the key, the decrypter removes the key from internal memory, e.g. cache (308). In one embodiment, the entity storing the key (130) and now erasing the key sends a command to the decrypter to erase the key. In one embodiment, where multiple decrypters are implemented, trusted communications are exchanged with the decrypters to ensure that the same key is removed from every decrypter. In one embodiment, the key is removed through secure deletion from the decrypter, e.g. the decrypter erases the key on command and ensures that no copy of the key exists in any location within the decrypter. Once the key has been deleted from the key manager or cache in the decrypter, data stored or held by the decrypter that was encrypted using the erased key is considered securely erased as access to any remaining data has been eliminated. Accordingly, the privacy of erased encrypted data is maintained through encryption key deletion.

As described and illustrated herein, the decrypter is supported by the application server and the key server as demonstrated in the system diagram and flow charts. In one embodiment, the functionality of the decrypter may be extrapolated to a cloud computing environment with a shared pool of resources.

Figure 4:
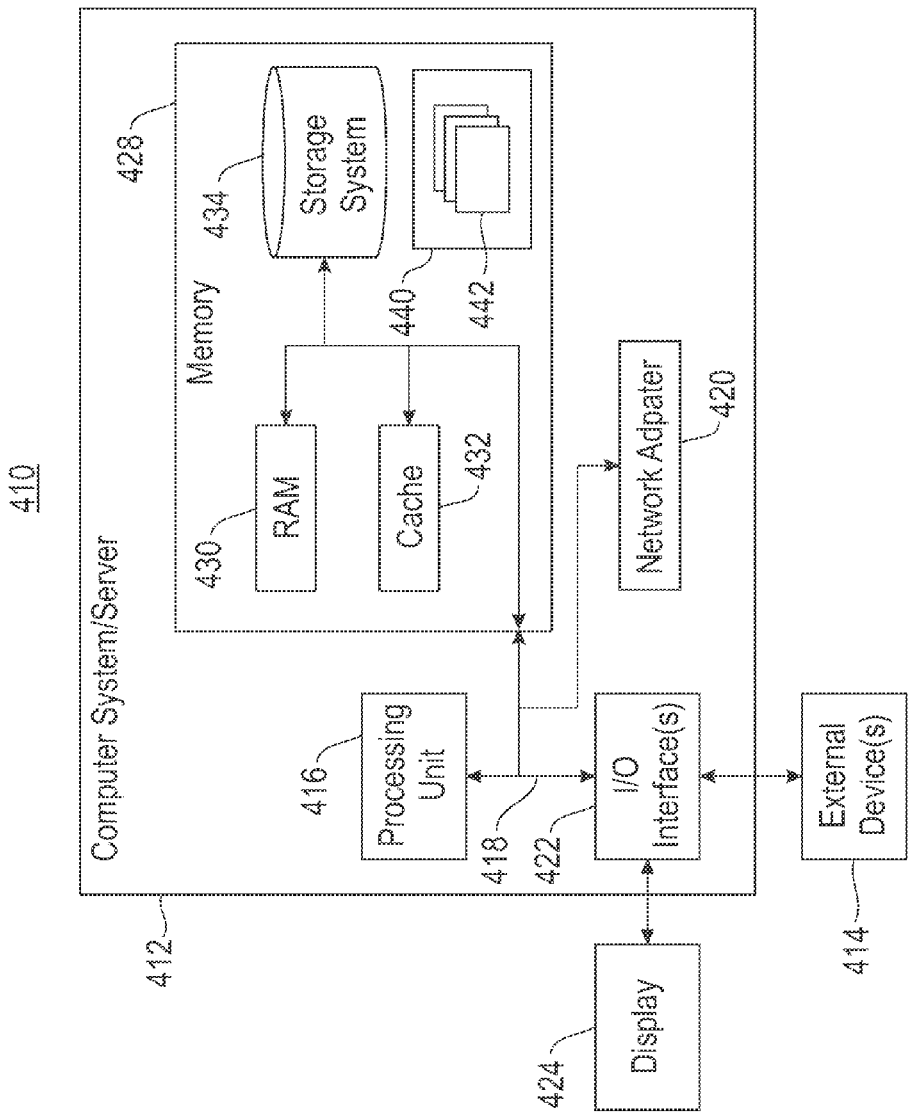
FIG. 4 depicts a computing node according to an embodiment of the present invention.

A cloud computing environment is service oriented with a focus on statelessness, low coupling, modularity, and semantic interoperability. At the heart of cloud computing is an infrastructure comprising a network of interconnected nodes. Referring now to FIG. 4, a schematic of an example of a cloud computing node is shown. Cloud computing node (410) is only one example of a suitable cloud computing node and is not intended to suggest any limitation as to the scope of use or functionality of embodiments of the invention described herein. Regardless, cloud computing node (410) is capable of being implemented and/or performing any of the functionality set forth hereinabove. In cloud computing node (410) there is a computer system/server (412), which is operational with numerous other general purpose or special purpose computing system environments or configurations. Examples of well-known computing systems, environments, and/or configurations that may be suitable for use with computer system/server (412) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (412) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (412) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server (412) in cloud computing node (410) is shown in the form of a general-purpose computing device. The components of computer system/server (412) may include, but are not limited to, one or more processors or processing units (416), system memory (428), and a bus (418) that couples various system components including system memory (428) to processor (416). Bus (418) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (412) typically includes a variety of computer system readable media. Such media may be any available media that is accessible by a computer system/server (412), and it includes both volatile and non-volatile media, and removable and non-removable media.

System memory (428) can include computer system readable media in the form of volatile memory, such as random access memory (RAM) (430) and/or cache memory (432). Computer system/server (412) may further include other removable/non-removable, volatile/non-volatile computer system storage media. By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (418) by one or more data media interfaces. As will be further depicted and described below, memory (428) may include at least one program product having a set (e.g., at least one) of program modules that are configured to carry out the functions of embodiments of the invention.

Program/utility (440), having a set (at least one) of program modules (442), may be stored in memory (428) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments of the invention as described herein.

Computer system/server (412) may also communicate with one or more external devices (414), such as a keyboard, a pointing device, a display (424), etc.; one or more devices that enable a user to interact with computer system/server (412); and/or any devices (e.g., network card, modem, etc.) that enable computer system/server (412) to communicate with one or more other computing devices. Such communication can occur via Input/Output (I/O) interfaces (422). Still yet, computer system/server (412) can communicate with one or more networks such as a local area network (LAN), a general wide area network (WAN), and/or a public network (e.g., the Internet) via network adapter (420). As depicted, network adapter (420) communicates with the other components of computer system/server (412) via bus (418). It should be understood that although not shown, other hardware and/or software components could be used in conjunction with computer system/server (412). Examples, include, but are not limited to: microcode, device drivers, redundant processing units, external disk drive arrays, RAID systems, tape drives, and data archival storage systems, etc.

Figure 5:
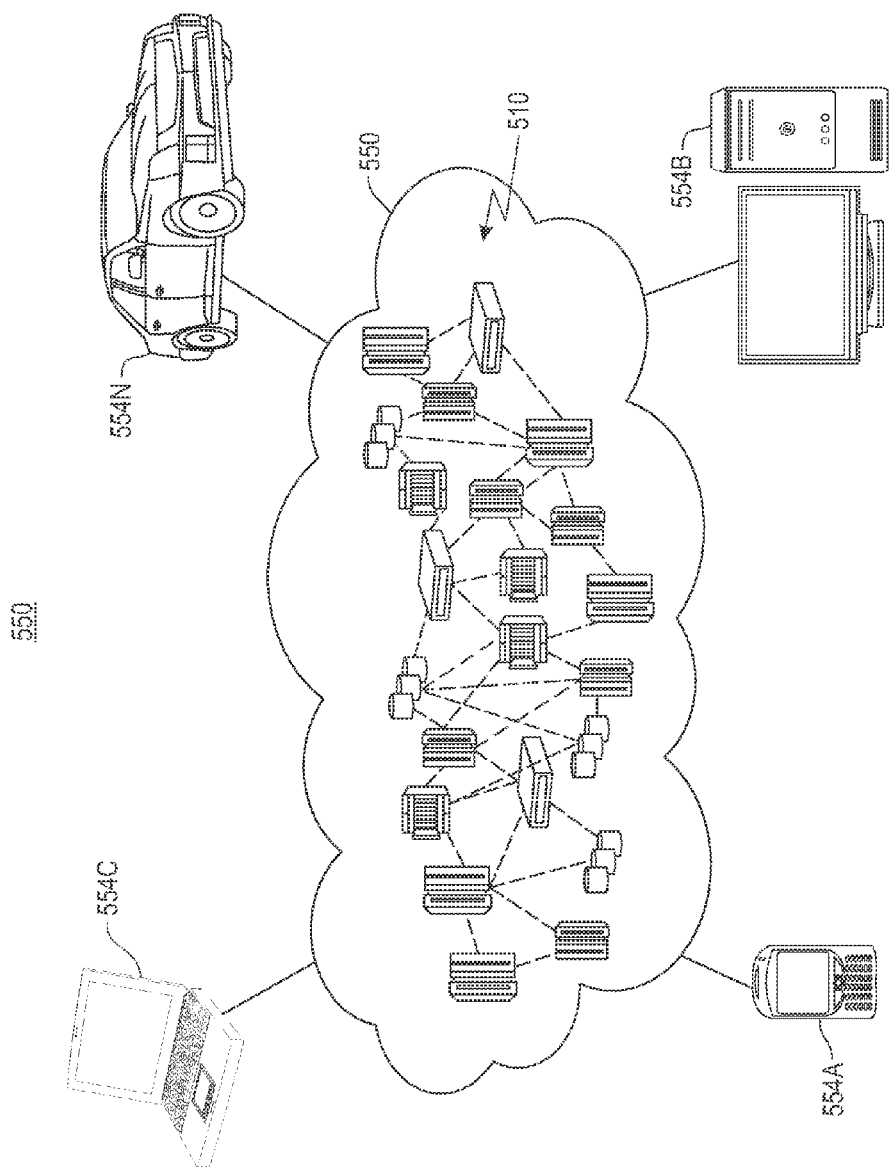
FIG. 5 depicts a computing environment according to an embodiment of the present invention.

Referring now to FIG. 5, illustrative cloud computing environment (550) is depicted. As shown, cloud computing environment (550) comprises one or more cloud computing nodes (510) with which local computing devices used by cloud consumers, such as, for example, personal digital assistant (PDA) or cellular telephone (554A), desktop computer (554B), laptop computer (554C), and/or automobile computer system (554N) may communicate. Nodes (510) may communicate with one another. They may be grouped (not shown) physically or virtually, in one or more networks, such as Private, Community, Public, or Hybrid clouds as described hereinabove, or a combination thereof. This allows cloud computing environment (550) to offer infrastructure, platforms and/or software as services for which a cloud consumer does not need to maintain resources on a local computing device. It is understood that the types of computing devices (554A)-(554N) shown in FIG. 5 are intended to be illustrative only and that computing nodes (510) and cloud computing environment (550) can communicate with any type of computerized device over any type of network and/or network addressable connection (e.g., using a web browser).

Figure 6:
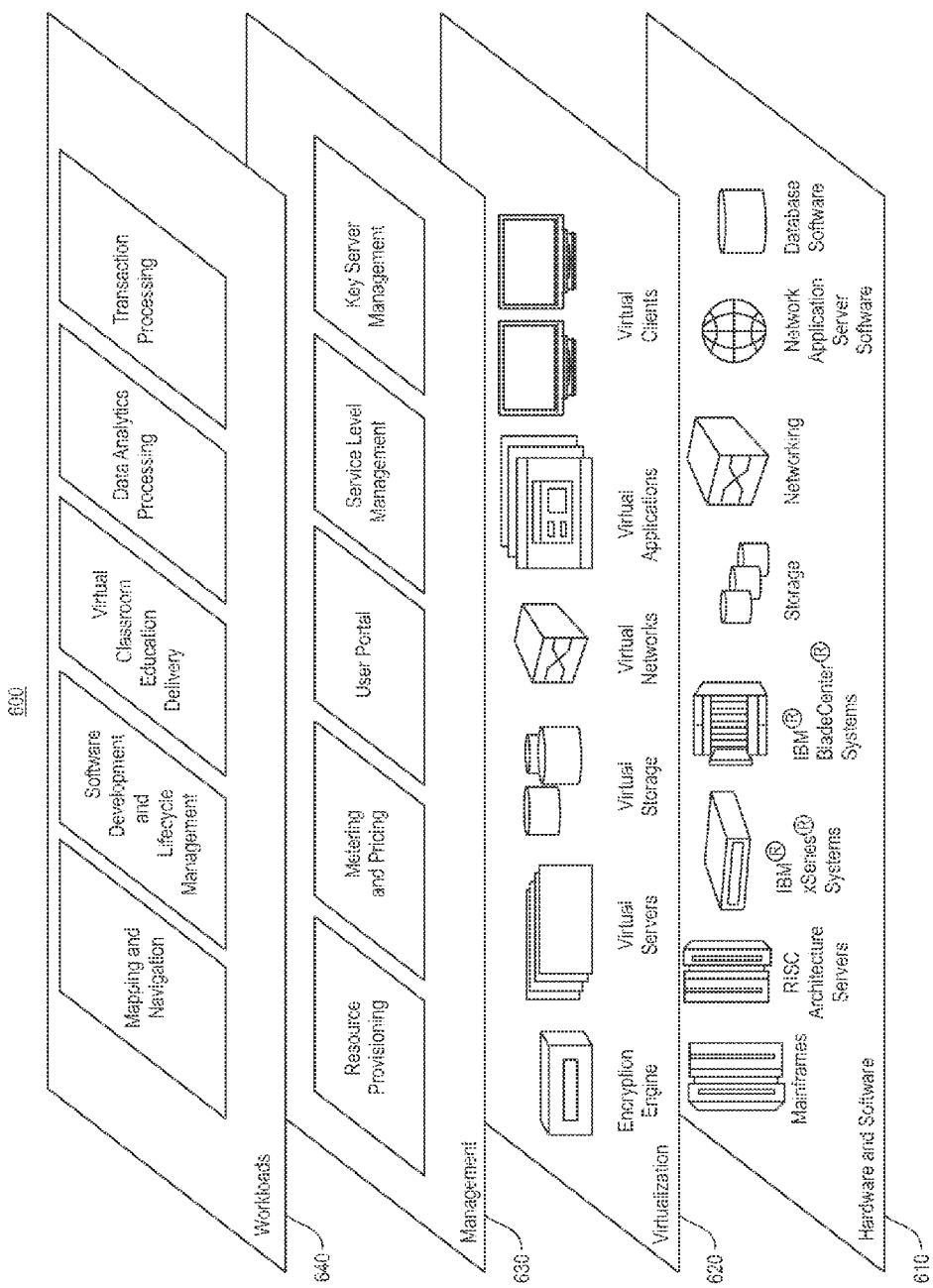
FIG. 6 depicts abstraction model layers according to an embodiment of the present invention.

Referring now to FIG. 6, a set of functional abstraction layers provided by cloud computing environment (600) is shown. It should be understood in advance that the components, layers, and functions shown in FIG. 6 are intended to be illustrative only and embodiments of the invention are not limited thereto. As depicted, the following layers and corresponding functions are provided: hardware and software layer (610), virtualization layer (620), management layer (630), and workload layer (640). The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; virtual clients; and an encryption engine.

In one example, a management layer (630) may provide the following functions: resource provisioning, metering and pricing, user portal, service level management, and key server management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Key server management provides cloud computing key storage and lifecycle management such that required encryption and management of associated encrypted data are met.

Workloads layer (640) provides examples of functionality for which the cloud computing environment may be utilized. In the shared pool of configurable computer resources described herein, hereinafter referred to as a cloud computing environment, files may be shared among users within multiple data centers, also referred to herein as data sites. Accordingly, a series of mechanisms are provided within the shared pool to support organization and management of data storage within the cloud computing environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to data encryption and decryption, including, but not limited to, processing and re-encryption of the data within a shared pool of resources.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
   a decrypter receiving at least one data block for storage, and determining that the received data block comprises ciphertext encrypted with a key associated with an encryption algorithm;
   instantiating a decryption algorithm to decrypt the received data block, wherein the instantiation comprises:
     determining the encryption algorithm used to encrypt the received data block;
     gathering auxiliary data to decrypt the received data block, wherein the auxiliary data is associated with the encryption algorithm;
     obtaining the key; and
     determining an additional input from the auxiliary data;
   decrypting the received data block to a non-encrypted data block, the decrypting employing the key and the additional input;
   transforming the non-encrypted block, including performing one or more storage efficiency functions to the non-encrypted data block; and
   re-encrypting the transformed data block with the key and the additional input prior to the re-encrypted data leaving the decrypter.

2. The method of claim 1, wherein the instantiation further comprises selecting a tool to decrypt the received block.

3. The method of claim 1, further comprising the decrypter erasing knowledge of the key related to specific data.

4. The method of claim 1, wherein the storage efficiency function is selected from the group consisting of: data reduction, compression, de-duplication, and combinations thereof.

5. The method of claim 1, further comprising denying the decrypter access to the key, wherein the access denial prevents the decrypter from decrypting stored ciphertext.

6. The method of claim 1, further comprising denying the decrypter access to the key, wherein the access denial prevents the decrypter from decrypting received data.

7. The method of claim 1, further comprising selecting the decryption algorithm based on the key and the additional input.

8. The method of claim 1, wherein the additional input is selected from the group consisting of: tweak, seed, salt, and initialization vector.

9. A computer program product for storing encrypted data, the computer program product comprising a computer readable storage device having program code embodied therewith, the program code executable by a processor to:
- determine that a received data block comprises ciphertext encrypted with a key associated with an encryption algorithm;
- instantiate a decryption algorithm for the received data block, wherein the instantiation comprises program code to:
  - determine the encryption algorithm used to encrypt the received data block;
  - gather auxiliary data, wherein the auxiliary data is associated with the encryption algorithm;
  - obtain the key; and
  - determine an additional input from the auxiliary data;
- decrypt the received data block to a non-encrypted data block, the decrypting employing the key and the additional input;
- transform the non-encrypted block, including performing one or more storage efficiency functions to the non-encrypted data block; and
- re-encrypt the transformed data block with the key and the additional input prior to the re-encrypted data leaving the decrypter.

10. The computer program product of claim 9, wherein the instantiation further comprises program code to select a tool to decrypt the encrypted data.

11. The computer program product of claim 10, wherein the code to re-encrypt the decrypted block is processed within the decrypter.

12. The computer program product of claim 9, further comprising program code to erase knowledge of the key related to specific data.

13. The computer program product of claim 9, wherein the storage efficiency function is selected from the group consisting of: data reduction, compression, de-duplication, and combinations thereof.

14. The computer program product of claim 9, further comprising program code to deny the decrypter access to the key, wherein the access denial prevents decryption of the ciphertext.

15. The computer program product of claim 9, further comprising program code to restrict access of privileged information within the decrypter to authorized components within the decrypter, the access restricted by a component selected from the group consisting of: hardware and software.

16. The method of claim 9, wherein the additional input is selected from the group consisting of: tweak, seed, salt, and initialization vector.

17. A system comprising:
- a decrypter in communication with data storage for efficient storage of encrypted data;
- a functional unit in communication with the decrypter, the functional unit in communication with tools to support efficient data storage, the tools comprising:
  - an encryption key manager to instantiate a decryption algorithm to decrypt a received data block comprising ciphertext, the ciphertext encrypted with a key associated with an encryption algorithm, wherein the instantiation comprises:
    - determining the encryption algorithm used to encrypt the received data block;
    - gathering auxiliary data, wherein the auxiliary data is associated with the encryption algorithm;
    - obtaining the key; and
    - determining an additional input from the auxiliary data;
  - a decryption manager to decrypt the received data block to a non-encrypted data block, the decryption manager employing the key and the additional input;
  - a data-function manager to transform the non-encrypted block, including performing one or more storage efficiency functions to the non-encrypted data; and
  - an encryption manager to re-encrypt the transformed data with the key and the additional input prior to the re-encrypted data leaving the decrypter.

18. The system of claim 17, wherein the additional input is selected from the group consisting of: tweak, seed, salt, and initialization vector.

* * * * *